United States Patent [19]
Gibbs

[11] Patent Number: 5,381,620
[45] Date of Patent: Jan. 17, 1995

[54] LURE UTILIZING EASILY CHANGED AFT PORTION OF SOFT, FLEXIBLE TEXTURE

[75] Inventor: Louie W. Gibbs, Clermont, Fla.

[73] Assignee: Classic Fishing Products, Inc., Clermont, Fla.

[21] Appl. No.: 91,992

[22] Filed: Jul. 14, 1993

[51] Int. Cl.⁶ .............................................. A01K 85/00
[52] U.S. Cl. ..................................................... 43/42.09
[58] Field of Search .................. 43/42.09, 42.29, 42.31

[56] References Cited

U.S. PATENT DOCUMENTS

| | | | |
|---|---|---|---|
| 1,867,458 | 7/1932 | Keuper | 43/42.09 |
| 2,295,292 | 9/1942 | Rogers | 43/42.09 |
| 2,441,302 | 5/1948 | Watkin . | |
| 2,556,702 | 6/1951 | Nielsen | 43/42.09 |
| 2,573,592 | 10/1951 | Nickel | 43/42.09 |
| 2,954,634 | 10/1960 | Peschong | 43/42.09 |
| 2,996,826 | 8/1961 | Lamar | 43/42.09 |
| 3,069,801 | 12/1962 | Mills | 43/42.09 |
| 3,359,674 | 12/1967 | Strumor . | |
| 3,405,476 | 10/1968 | Pumilio | 43/42.09 |
| 3,608,228 | 9/1971 | Borresen et al. . | |
| 3,979,853 | 9/1976 | Storm | 43/42.09 |
| 4,672,768 | 6/1987 | Pippert | 43/42.09 |
| 4,807,387 | 2/1989 | Dougherty, Jr. et al. . | |
| 4,941,280 | 7/1990 | Rinaldi . | |
| 5,070,639 | 12/1991 | Pippert . | |
| 5,144,765 | 9/1992 | Keeton | 43/42.31 |
| 5,189,825 | 3/1993 | Stewart . | |

FOREIGN PATENT DOCUMENTS 477175  9/1951  Canada .
1017566  9/1977  Canada .

Primary Examiner—Kurt Rowan
Attorney, Agent, or Firm—Julian C. Renfro

[57] ABSTRACT

A fishing lure utilizing an easily changed tail portion, with the head member being of hard, relatively rigid construction, to the rear of which any one of a variety of generally similar tail members of soft, flexible plastic may be attached in a secure manner. The head member has first and second attachment points thereon, to which a fishing line and a fishhook may be respectively attached, with this member also having an aft portion upon which one or more rearwardly directed attachment devices are mounted. The attachment device or devices involve at least one rearwardly extending component having an enlarged portion, with each tail member to be used with the head member having a forwardmost portion in which least one cavity is disposed. Such cavity is smaller than the enlarged portion of the rearwardly extending component, and positioned so as to be able to be brought into alignment with the at least one rearwardly protruding component of the head member, and to be received thereon in a tight yet removable manner. The attachment device or devices may be mounted in a comparatively large cavity or recess defined by a rearwardly extending lip or flange disposed around the aft edge of the head member. Into this cavity or recess the forwardmost portion of the tail member extends in a closely fitting manner, the interfit between the head member and the tail member being such as to prevent the ingress of water during use of the lure.

22 Claims, 2 Drawing Sheets

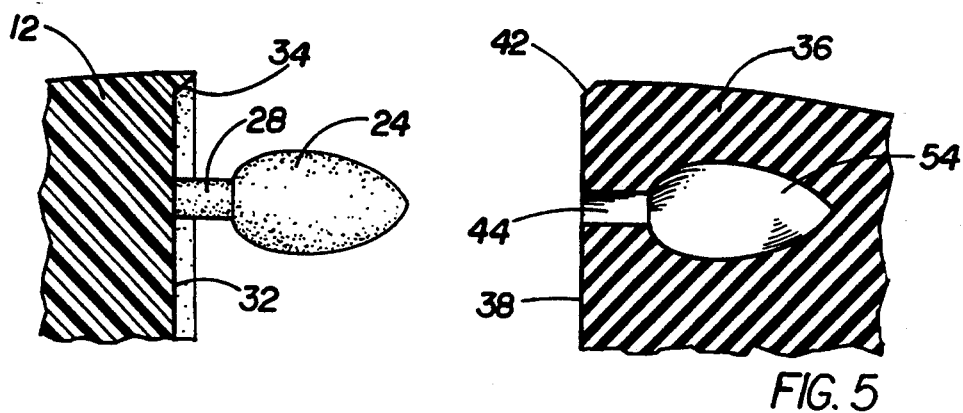
FIG. 5
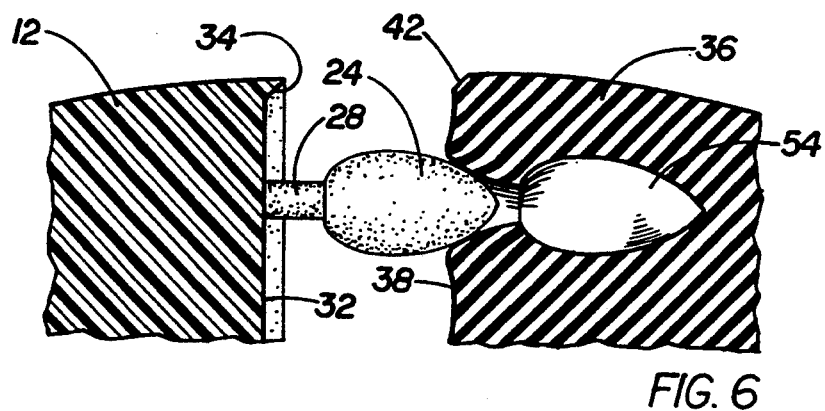
FIG. 6
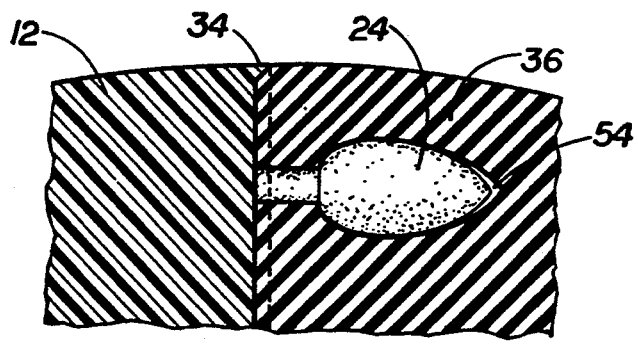
FIG. 7
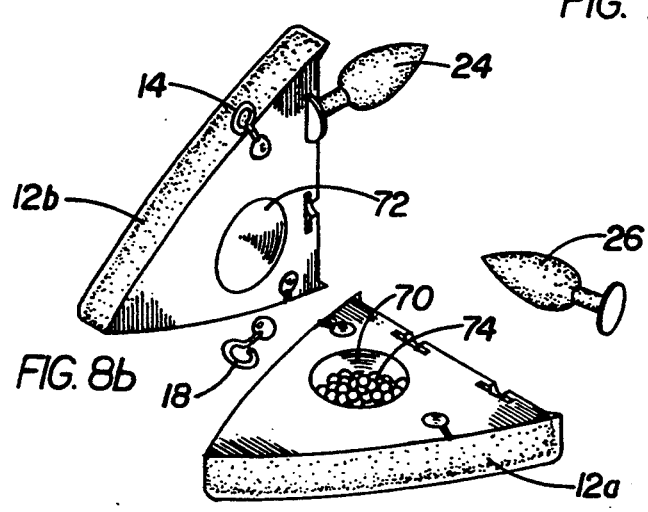
FIG. 8a
FIG. 8b

LURE UTILIZING EASILY CHANGED AFT PORTION OF SOFT, FLEXIBLE TEXTURE

BACKGROUND OF THE INVENTION

1. Field of the Invention

The present invention relates to a quick change fishing lure, and more particularly, but not by way of limitation, to a fishing lure having body parts which are quickly interchangeable with other body parts in order to readily accomplish a change of color.

2. Description of the Prior Art

A great variety of fishing lure designs have been developed heretofore. One design type which has gained appreciable popularity is generally comprised of a body having the appearance of a minnow or shad, i.e., the body has a front head portion and a tail portion with simulated eyes, gills and fins painted thereon. In addition, such lures include a submergence inducing deflector attached to the body at the front head portion thereof. The position, size and shape of the deflector determine the particular depth at which the lure swims, and together the fish-like shape of the body causes the lure to wriggle as it is pulled through the water.

Some of the prior fishing lures of the type describe above have included detachable or interchangeable parts. For example, U.S. Pat. No. 4,183,164 discloses a fishing lure having a lip member (deflector) which is detachable from the lure body when an elongate screw is removed from the body. The lip member can be interchanged to affect the depth to which the lure dives when fished. U.S. Pat. No. 3,091,883 is directed to a fishing lure comprised of separably connectible component parts which are capable of being manually assembled and disassembled to vary the appearance and affect of the lure.

Both the U.S. Pat. No. 3,608,228 to Borresen et al and the Canadian Patent No. 477,175 to Neff teach the utilization of male screw threads in one lure part, and female threads in the other lure part so as to make the head member and the tail member of the lure separable. This has the obvious disadvantages of additional expense as well as requiring one lure member to be rotated for several turns with respect to the other member.

The Rinaldi U.S. Pat. No. 4,941,280 entitled "Two-Piece Body Fishing Lure" is in the nature of a so-called "crank bait," in that his lure has a slant, concave face causing the lure to move through the water in a submerged condition while the fisherman is "cranking" it in. Although the Rinaldi lure is configured to permit the fisherman to accomplish a color change by substituting an upper body portion of one color with an upper body portion of another color, that lure requires that the lower body portion be provided with a longitudinally oriented keyway utilized for enabling the body parts of the lure to be held together.

I am aware that still other lure designs involve the head member having rearwardly extending components upon which the tail member is mounted, but not only has such an approach involved rather expensive construction, but also in such configurations, the tail member has tended to separate from the head portion during use.

Notwithstanding the fact that certain prior lures have been capable of partial disattachment or disassembly, some of these have been of expensive construction, whereas others are of such construction as to make it possible, unfortunately, from one body portion of a lure to become separated from another body portion during use. Still other lure constructions make it necessary for the fisherman to disconnect the fishing line from the lure and then reconnect the fishing line to that lure or another lure when it is desired to change the depth of submergence of the lure, change the color of the lure, change the shape of the lure body, etc.

It is to overcome the disadvantages of these and other prior art devices that the instant invention was evolved.

SUMMARY OF THE INVENTION

As will be seen in greater detail hereinafter, this invention relates to a fishing lure featuring a head member of relatively hard construction, to which any one of a variety of tail members of relatively soft, pliable material may be removably attached. This general class of lure is frequently provided with a head portion disposed at an angle, this forming a submergence inducing deflector causing the lure to run submerged at a desired depth while the fisherman is cranking it in. In accordance with such a use, the fisherman would throw the lure out as far as he can, and then steadily retrieve it by operation of his reel, with the angularity of the head portion causing the lure to stay at a desired depth during the recovery effort. By one portion of the lure being readily separable from the other, the fisherman can readily bring about a change of color, so as to make the lure more attractive to certain fish.

If the interfitting portions of a lure are intricately configured, this necessarily drives up the price of the lure, making it very difficult for such a lure to be marketed at a competitive price. On the other hand, if a lure having replaceable portions fails to utilize attachment means that will remain tightly together at all times during use, there can be a strong likelihood that one lure portion will undesirably separate from the other at the wrong time.

In accordance with the instant invention, the relatively hard head member has a first attachment point to which a fishing line may be attached, and a second attachment point to which a fishhook may be attached. Significantly, the head member has an aft portion upon which rearwardly directed attachment means are mounted, with such attachment means preferably taking the form of at least one but preferably two rearwardly protruding components, disposed in a spaced-apart relationship. The outermost portion of each of these rearwardly protruding components is enlarged so as to form an oval configuration. Correspondingly, each tail member has a forward portion in which at least one but preferably two apertures are disposed, with such aperture or apertures being positioned so as to be able to be brought into alignment with the rearwardly protruding component or components on the head member, and to be removably inserted thereon.

Undesired separation of the tail member is prevented by constructing the tail member of relatively soft, flexible, resilient plastic, into which undersize holes are provided. As soon as the enlarged parts of the rearwardly protruding components of the head member have been pushed through the holes and received in the recesses or cavities provided in the tail member, the material of the tail member closes around the protruding components in such a manner that the tail member will be quite tightly attached to the head member.

The unfortunate tendency of certain relatively inexpensive lures to come apart during use is effectively prevented by the advantageous construction utilized herein, wherein the soft, flexible plastic of the aft portion of the lure engages the rearwardly protruding components of the head member in an exceedingly tight manner. In addition, the aft portion of the head member can be slightly recessed, so as to provide a location in which the forwardmost part of the aft member of flexible material can reside, with this arrangement effectively preventing water from getting between the forward and aft portions of the lure, so as to cause them to become separated during use.

The arrangement I utilize enables on the one hand the fisherman to rapidly change lure color by substituting one aft portion for another, and on the other hand to accomplish this in such a way as to enable large manufacturing costs to be avoided, and to obviate the tendency for the aft portion to become separated during use.

Although the aft portion provided in accordance with this invention practically never becomes separated during use, the fisherman, by a determined effort, can readily remove one soft, flexible, resilient tail member, and replace it with another tail member, such as one of a different color, or one that will wriggle in a particular way, or possess some other characteristic.

Another important characteristic of my invention is that the attachment means provided are such as not to require the aft portion of the lure to have an undesirably rigid texture. Rather, the soft plastic I advantageously use in creating the aft portions of my lures is such that the mouth of the fish comes into contact with a soft body portion that collapses in a very realistic fashion. This soft body portion provides a very realistic feel to the fish, much more realistic than other lures on the market, thus making it less likely that the fish will reject the bait.

It is therefore a primary object of my invention to provide a relatively low cost, multicomponent fishing lure utilizing a highly advantageous attachment arrangement, making it readily possible for one tail member to be substituted for another tail member, with a minimum turn-around time being involved in such substitution.

It is another object of my invention to provide an inexpensive yet highly attractive fishing lure involving the use of a relatively hard head member in concert with a flexible, resilient tail member of low cost, which is unlikely to become separated from the head portion during use, yet able to be readily exchanged for another tail member in a minimum of time, with no untying of the fishline being involved.

It is yet another object of my invention to provide a technique making it readily possible for the tail portion of a lure to be removably attached to the head portion in an exceedingly tight and reliable manner, despite the fact that the tail portion is of soft, flexible material.

It is yet still another object of this invention to provide a head member having a pair of rearwardly protruding components of a highly desirable configuration, which components can readily receive any of a number of different tail members, with assembly of a selective tail member onto the protruding components of the head member being accomplished by a quick snap-on motion, which may later be followed by a quick removal of the tail member so that a different tail member can be immediately substituted.

It is yet another object of my invention to provide a novel lure utilizing easily interfitted head and tail members that may be easily manufactured utilizing state-of-the-art materials, without requiring any complex manufacturing steps or expensive components, which lure can be utilized in such a manner as not to necessitate the intricate procedure which, in accordance with the prior art, the fisherman had to go through in order to substitute one tail member for another.

It is yet another object of my invention to provide a lure possessing the highly advantageous characteristics that enable a rapid color change, accomplished by the use of components permitting manufacture at a relatively low cost, that do not become separated during any normal use, and which present a lure of very pleasing texture to the fish, making unlikely any rejection of the lure by a fish.

These and other objects, features and advantages will be more apparent from a study of the appended drawings and text.

BRIEF DESCRIPTION OF DRAWINGS

FIG. 5 is a cross-sectional view to a larger scale, depicting one set of head and tail attachment means immediately prior to the procedure of installing the tail member onto the upper protruding components;

FIG. 6 is a cross sectional view similar to FIG. 5, here depicting the commencement of the tail attachment procedure, wherein the somewhat enlarged portion of a rearwardly extending mounting component of the head is shown entering the respective aperture and recess provided in the tail member of flexible material;

FIG. 7 is another cross-sectional view, this view revealing the soft, flexible material of the tail member having closed around the somewhat enlarged portion of the rearwardly protruding mounting component, to complete the attachment procedure; and FIGS. 8a and 8b reveal that the head member of relatively hard material can be made in two halves, one the mirror image of the other, and with a cavity created in each head half in order that a rattle chamber can be formed in the finished lure.

DETAILED DESCRIPTION

Figure 1:
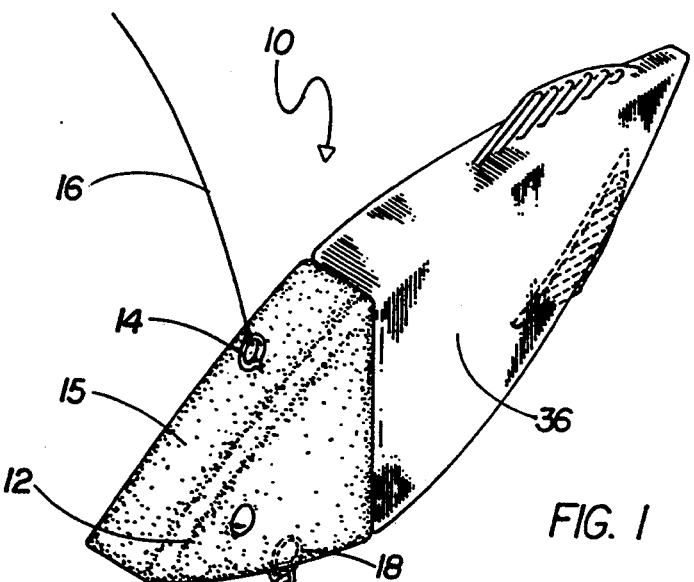
FIG. 1 is a overall view of a preferred embodiment of my fishing lure utilizing separable head and tail members joined together by a novel snap-on technique, with the tail member being of a texture very pleasing to most fish.

With initial reference to FIG. 1, it will be seen that I have depicted a preferred embodiment of my novel fishing lure 10, which features a head member 12 of relatively hard, rigid construction, to the aft end of which any one of a variety of tail members 36 may be removably attached.

The head member 12 is provided with an upper attachment point or eyelet 14 to which a fishing line 16 may be attached, and a lower attachment point or eyelet 18 to which a fishhook 20 may be affixed. The hook 20 may for example be a three point hook known as a "treble" hook.

It typically is desirable for the front upper portion of the head member to present an inclined surface 15, best seen in FIG. 1, so that when the fisherman by the use of line 16 pulls this lure through the water, the inclined front surface forms a submergence inducing deflector tending to cause the lure to run in a desirably submerged condition. Because a lure of this type is typically cast by the fisherman to the greatest distance possible, and the reel then operated so as to crank in the bait at a desired speed, it has been common in the industry to refer to this type of lure as a "crank bait."

In distinct comparison with other lures having separable portions, but requiring the aft or tail portion to have a substantial degree of hardness for reasons of retention, the aft portion or tail member 36 I provide in accordance with this invention involves the utilization of a relatively soft, resilient plastic that will collapse in the fish's mouth in a very realistic way, such that the fish obviously believes it has encountered a live bait. Despite the fact that the aft portion I prefer to utilize is made of relatively soft plastic, the attachment means I employ for enabling the forward and aft portions of the lure to be interfitted is of such a nature as to bring about a very tight fit, and to make it quite unlikely that the aft portion will be lost from the head portion during any type of normal use.

Figure 2:
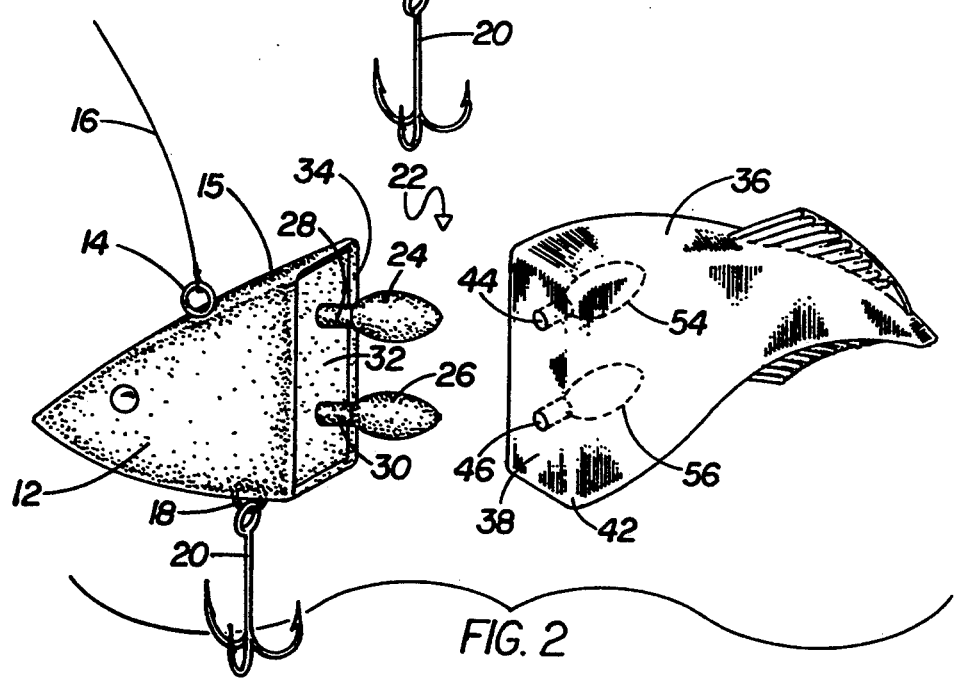
FIG. 2 is an exploded view revealing the rearwardly directed attachment means utilized on an aft portion of the head member, which rearwardly directed attachment means are received in corresponding recesses provided in the tail member made of flexible, resilient material, with this arrangement being such that only a minimal effort on the part of a fisherman is involved in order that one tail member can be substituted for another.

With reference now to the exploded view identified as FIG. 2, the details of the head and tail members are revealed in greater detail, and from this figure it can be seen that the rearwardly protruding attachment means 22 I use may take the form of a pair of rearwardly extending attachment members 24 and 26, which members are mounted in a spaced relationship on the aft portion of the head member 12. It will also be seen that I have provided upper and lower apertures 44 and 46 in the forwardmost part of the tail member 36, which apertures are located at the same spacing as the protruding members 24 and 26. As will be described at substantial length hereinafter, the attachment means 24 and 26 of the head member 12 are intended to tightly fit into the apertures 44 and 46 at such time as a selected tail member 36 is to be installed onto the head member 12.

In the preferred embodiment of my invention, the rearwardly directed attachment means 22 takes the form of an upper, rearwardly extending component or mounting member 24, and a lower, rearwardly extending component or mounting member 26. The forwardmost portions of both protruding components, the shank members 28 and 30, are securely affixed in what may be regarded as a permanent manner in the relatively hard head member 12, as will be hereinafter discussed.

I preferably install the upper and lower rearwardly protruding components 24 and 26 in a relatively shallow recess 32 provided at the aft end of the head member 12, with the interrelationship of the head member with a flexible tail member 36 of a selected color being of such a nature as to effectively prevent water from getting between the aft end of the head member, and the front end or forwardmost portion 38 of the tail member, where it might well tend to force these members apart.

To assure against the entry of water, I utilize a rearwardly directed lip or shoulder 34 extending around the aft portion of the head member 12, which serves to define the shallow recess 32. I also configure the outer edge 42 of the forwardmost portion 38 of the tail member 36 such that it can be tightly received inside the angled rear edge portion 34 of the head member 12. In other words, the outer circumferential portion of the front of the tail member 36 has a "broken" edge 42 configured such that will fit closely against the inner portion of the surrounding circumferential edge 34 at such time as the tail member has been properly installed upon the attachment means 22 of the head member 12.

Because of this construction, the head and tail members can be expected to fit tightly together in the manner shown in FIGS. 1 and 7 when the upper and lower protruding components 24 and 26 have been fully inserted into the upper and lower apertures 44 and 46 of the tail portion, and into the recesses 54 and 56 residing directly behind the apertures 44 and 46, respectively.

Figure 3A:
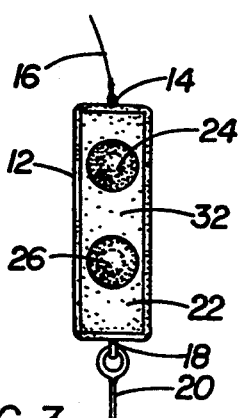
FIG. 3a is a view of the aft end of my novel head member, looking forwardly in order to reveal the approximate placement of the pair of rearwardly protruding components utilized in accordance with the preferred embodiment, which rearwardly protruding components preferably reside in a generally concave recess provided on the aft portion of the head member.

As shown in FIGS. 2, 3a and certain other figures, the upper and lower protruding components or protuberances 24 and 26 each preferably have an enlarged, somewhat bulbous rearmost portion, that also may be characterized as being generally of oval or football-shape. These rearwardly protruding components 24 and 26 may extend for perhaps ½" away from the aft recess 32 of the head member 12, and it is to be noted that these football-shaped components are of decidedly larger diameter than the shank portions 28 and 30, upon which these rather bulbous portions 24 and 26, respectively, are supported, and also larger than the apertures 44 and 46. The bulbous portions typically are at least twice the diameter of the shank portions. The reason for this arrangement will soon be made apparent.

Figure 4:
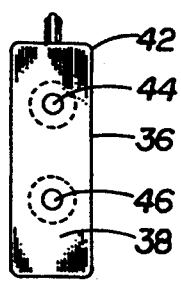
FIG. 4 is a view of the forwardmost portion of a typical tail member, looking rearwardly in order to reveal a spaced pair of cavities or recesses provided to receive in a very tightly fitting manner, the rearwardly protruding components mounted on the head member.

As shown in FIGS. 2 and 4, the tail member 36 has a forwardmost portion 38 in which the previously mentioned upper aperture 44 and the lower aperture 46 are located, with the aperture 44 leading to an upper cavity or recess 54, and the lower aperture 46 leading to a lower cavity or recess 56 created in the relatively soft and pliable tail member. The spacing of these recesses 54 and 56 is approximately the same as the distance apart of the upper protruding component 24 and the lower protruding component 26 that are mounted in the shallow recess 32 located in the aft portion of the head member 12. As is obvious, the intent is for the recesses 54 and 56 to tightly receive the upper and lower protruding components 24 and 26 when it is desired to insert a particular tail member 36 onto the attachment means 22 mounted on the aft portion of the head member 12. The combined depth of the aperture 44 and the recess 54 is at least as great as the length of the upper protruding component 24 and its shank portion 28. Similarly, the combined depth of the aperture 46 and the recess 56 is at least as great as the length of the lower protruding component 26 and its shank portion 30.

Because I construct the tail member 36 of a relatively soft, stretchy, resilient material in the interests of making the lure as realistic as possible to the fish, it is not particularly difficult for the fisherman to insert the recesses 44 and 46 of a selected tail member 36 onto the upper and lower protruding components 24 and 26 of the head member. By way of example, the tail member 36 preferably is made of the same type of flexible, resilient plastic as plastic fishing worms, which typically is polyvinylchloride (PVC), and this characteristic makes it readily possible for the apertures 44 and 46 leading to the recesses 54 and 56 to stretch sufficiently as to accept the football-shaped upper and lower protruding components 24 and 26. Because of the resilient nature of the plastic I use in the creation of the tail members 36, it can be expected to close tightly around the components 24 and 26 after these components have been inserted to their full depth into the corresponding recesses provided in the tail member.

Figure 3B:
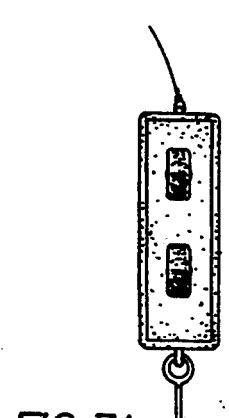
FIG. 3b is a view generally similar to FIG. 3a, but showing how the upper and lower protruding components of the head member may be essentially flat, so as to be received in a comparatively thin tail member.

Although I typically utilize rearwardly extending mounting components that are essentially circular in cross-section, as indicated in FIG. 3a, I am not to be limited to this, for other configurations may be effectively used in certain instances. For example, when the tail of the lure is comparatively thin, the upper and lower rearwardly extending mounting members may be flat, as indicated in FIG. 3b. In such event, the recesses provided in the tail member are of complementary configuration, so as to assure a tight fit.

Turning now to related FIGS. 5 through 7, it will be seen that I have depicted to a rather large scale, the upper protruding component 24 that is mounted in the shallow recess 32 located in the aft portion of the head member 12, such recess of course being defined by the surrounding edge or lip 34. It is to be noted that the enlarged component 24, supported from a shank 28 rigidly attached to the rear end of the head member 12, is in alignment with upper aperture 44 of the tail member. Immediately behind the upper aperture 44 is the upper recess 54, as previously mentioned.

Although not illustrated in related FIGS. 5 through 7, it is to be understood that the upper rearwardly protruding component 24 may be accompanied by lower rearwardly protruding component 26, in the manner illustrated in FIG. 2. In such event, the rearwardly extending component 26 is aligned at the same time with lower aperture 46 of the tail member 36.

As shown in FIG. 6, the somewhat bulbous upper component 24 has commenced its entry into the upper aperture 44, leading toward the cavity or deep recess 54. Because of the stretchy, resilient nature of the plastic I use in the creation of the tail member 36, it can be expected to readily accommodate the entry of the enlarged portion 24.

In FIG. 7 it is to be seen that the enlarged member 24 has passed entirely through the aperture 44, and has moved into the recess 54. At this point, the forwardmost portion 38 of the tail member is fitted tightly against the essentially flat surface of the recess 32. Because of the provision of the surrounding lip or edge 34 that extends around the circumference of the aft portion of the head member 12, a particularly tight interfit is assured, inasmuch as the circumferential portion or edge 42 of the tail member comes into tight contact with the underside of the lip or edge 34 of the head member 12. The interfitting relationship thus brought about is such that water cannot enter the space between the essentially flat surface of the shallow recess 32 and the forwardmost portion 38 of the tail member 36.

With continuing reference to FIG. 7, it is to be understood that at the same time the entire bulbous portion 24 is residing entirely within the cavity or recess 54, the entire bulbous portion 26 of the lower protruding component has passed through the lower aperture 46, and is residing in the lower recess 56, if a pair of rearwardly extending mounting members are in fact used.

It is quite important to note that the soft plastic material of the tail member 36 closes around the upper bulbous portion 24 immediately after insertion of the bulbous member into the recess 54, as depicted in FIG. 7. The same procedure is of course true with respect to the lower bulbous portion 26, so with both the bulbous member 24 and the bulbous member 26 locked into the tail member, the procedure of attaching the selected tail portion tightly onto the aft end of the head member 12 is completed.

Because of the provision of the surrounding edge 34 around the aft end of the head member, the possibility of the entry of water between the head and tail members is considerably lessened, and this of course means that it is quite unlikely that the tail member 36 will become separated from the head member during normal use.

By the use of my novel and highly advantageous tail attachment means 22, the tail member 36 remains tightly attached to the head member 12 during casting, trolling, retrieving and all other phases of fishing. However, the fisherman, by a determined effort, will be readily able to remove the tail member 36 by grasping it in one hand, and the head member 12 with the other hand, and then pulling these members apart. At such a time of applied force, the forward portions of the tail member 36 can enlarge and stretch in the vicinity of the cavities or recesses 54 and 56, making it possible for the fisherman to quickly remove one tail member from the rearwardly directed components 24 and 26, and to readily substitute another tail member.

As one example, the fisherman can substitute a tail member of a different color than was previously used, or he can substitute a tail member of a different configuration, or a tail member of a different characteristic or texture.

In no event is it necessary for the fisherman to untie his fishline, or engage in any unscrewing-type motion in order to bring about a separation of the novel head and tail members provided in accordance with this invention.

With reference now to FIGS. 8a and 8b, I have there shown a typical construction for the head member 12 depicted in FIGS. 1 and 2. FIG. 8a is to be seen to depict a component 12a, representing one half of the head member 12 taken along a vertical cutting plane, and FIG. 8b will be seen to represent component 12b, representing the other half of the head member, with one of these halves being essentially a mirror image of the other.

It will be noted that each of the halves 12a and 12b may be provided with suitably sized cavities or recesses in which the innermost ends of the shank portions 28 and 30 of the upper and lower protruding components 24 and 26 may be placed before the two halves of the head member are brought together and sealed. In a like manner, each of the halves is also provided with suitable cavities or recesses to receive the eyelet serving as the upper attachment point 14 and the eyelet serving as the lower attachment point 18. The bottoms or innermost portions of each of the cavities or recesses in the shallow recess 32 are somewhat enlarged, so as to receive somewhat enlarged innermost portions of the shank portions 28 and 30 of the upper and lower protruding components 24 and 26. Similarly, recesses are provided in the head members 12a and 12b, for receiving the upper and lower attachment points 14 and 18, which typically are also provided with somewhat enlarged innermost portions. This technique of course enables the upper and lower protruding components and the upper and lower eyelets to be installed in a manner so as not to pull away from the head member after the halves have been sealed together.

Also to be noted from FIGS. 8a and 8b is the fact that a central hollow portion or cavity 70 may be placed in head half 12a, and a corresponding central hollow portion or cavity 72 may be placed in head half 12b. In the general manner depicted in FIG. 8a, in the central hollow portion 70, a sizable number of small hard, spherically-shaped loose components 74 can be inserted, so as to bring about a desirable type of rattle when the two halves of the head member have been secured together. In this way, an optional rattle chamber may be readily defined in the central portion of the head member.

The head halves shown in FIGS. 8a and 8b can be secured together by a suitable glue or cement, but I prefer to utilize a type of sonic welding for bringing about the halves of the head member being secured together in a permanent manner.

Although I have shown only certain embodiments of my invention, it is to be understood that other embodiments within the spirit of this invention may be utilized for removably securing a head member and the tail member together in an inexpensive, snap-on, snap-off manner. For example, I am not to be limited to one head shape, or to heads made of hard plastic, for the head members could be of a different configuration than shown and described herein, or they could be made of a suitable metal, such as lead, brass or the like.

The tail members could in some instances be other than made of soft, flexible plastic, for in certain circumstances, tails could be made of foam material or semi-rigid material.

The rearwardly extending components having the enlarged portions are not required to each be in the general shape of a football, for while I prefer for the part of each component intended to enter the corresponding orifice of the tail member to be generally pointed, the opposite or shank side of each component may have a somewhat flattened surface, extending generally at a right angle to the shank serving to support the enlarged component.

To assure that a selected tail member will not be lost from the rearwardly extending components during a fishing effort, I prefer to make the enlarged portion of each component 24 and 26 at least twice the diameter of the shank from which the component is supported, and in certain instances, up to three or four times the diameter of the supporting shank. The components 24 and 26 may be made of hard, industrial grade plastic, or of a non-corrosive metal.

I am not to be limited to the use of two rearwardly extending support components having enlarged portions, for in some instances I could use a single component having an enlarged portion, or in the case of large lures with large tails, I could use three rearwardly extending components having enlarged portions designed to enter corresponding orifices in the tail member.

I am not to be limited except as required by the scope of the appended claims.

I claim:

1. A fishing lure utilizing an easily changed tail portion, said lure having a head member of rigid construction, to which any one of a variety of generally similar tail members may be removably attached, said head member having at least two attachment points thereon, to which a fishing line as well as a fishhook may be respectively attached, said head member having a rear portion upon which rearwardly directed attachment means are mounted, said attachment means involving at least one rearwardly extending component having an enlarged portion, each tail member to be used with said head member being made of soft, resilient material, having a forwardmost portion in which least one cavity is disposed, such cavity being smaller than said enlarged portion and positioned so as to be able to be brought into alignment with said at least one rearwardly extending component on said head member, and to be tightly yet removably received thereon, said rearwardly directed attachment means being mounted in a shallow recess located on said rear portion of said head member, the forwardmost portion of the tail member being configured to fit tightly in said shallow recess when said rearwardly directed attachment means has entered the respective cavity of the tail member, thus to prevent the entry of water between said head and tail members when said lure is in use.

2. The fishing lure utilizing an easily changed tail portion as recited in claim 1 in which said at least one rearwardly extending component involves an enlarged portion of bulbous configuration, adapted to be tightly received in a corresponding cavity of a tail member.

3. The fishing lure utilizing an easily changed tail portion as recited in claim 1 in which said at least one rearwardly extending component involves an enlarged portion that is essentially flat, said rearwardly protruding component adapted to be tightly received in a corresponding cavity of a tail member.

4. The fishing lure utilizing an easily changed tail portion as recited in claim 1 in which said lure has a spaced pair of rearwardly extending components, each having a bulbous portion adapted to be tightly received in a respective cavity located in a forward portion of a tail member.

5. A fishing lure utilizing an easily changed tail portion, said lure having a head member of hard, relatively rigid construction, to which any one of a variety of generally similar tail members may be removably attached, said head member having a first attachment point thereon, to which a fishing line may be attached, and a second attachment point thereon, to which a fishhook may be attached, said head member having an aft portion upon which rearwardly directed attachment means are mounted, said attachment means involving at least one rearwardly extending component having an enlarged portion, each tail member to be used with said head member being made of soft, resilient material, having a forwardmost portion in which least one cavity is disposed, such cavity being smaller than said enlarged portion and positioned so as to be able to be brought into alignment with said at least one rearwardly extending component on said head member, and to be tightly yet removably received thereon, said rearwardly directed attachment means being mounted in a shallow recess located on said aft portion of said head member, said shallow recess being defined by a rearwardly directed lip extending around the aft portion of said head member, the outer edge of the forwardmost portion of the tail member being configured to fit in tight engagement with said rearwardly directed lip when said rearwardly directed attachment means has entered the cavity of the tail member.

6. The fishing lure utilizing an easily changed tail portion as recited in claim 5 in which said at least one rearwardly extending component involves an enlarged portion of bulbous configuration, adapted to be tightly received in a corresponding cavity of a tail member.

7. The fishing lure utilizing an easily changed tail portion as recited in claim 5 in which said at least one rearwardly extending component involves an enlarged portion that is essentially flat, said rearwardly protruding component adapted to be tightly received in a corresponding cavity of a tail member.

8. The fishing lure utilizing an easily changed tail portion as recited in claim 5 in which said lure has a spaced pair of rearwardly extending components, each having a bulbous portion adapted to be tightly received in a corresponding cavity located in a tail member.

9. The fishing lure utilizing an easily changed tail portion as recited in claim 5 in which said head member is made from a pair of halves taken along a vertical cutting plane, with one half being what may be regarded as essentially a mirror image of the other half, and with the halves being secured together in a permanent manner.

10. The fishing lure utilizing an easily changed tail portion as recited in claim 9 in which a central cavity is provided in at least one of said head halves, for receiving a multiplicity of small, hard, generally spherical members, such that a rattle chamber will be defined in a completed head member.

11. A fishing lure utilizing an easily changed tail portion, said lure having a head member of relatively hard construction, to which any one of a variety of generally similar tail members may be removably attached, said head member having a first attachment point thereon, to which a fishing line may be attached, and a second attachment point thereon, to which a fishhook may be attached, said head member having an aft portion upon which rearwardly directed attachment means are mounted, said attachment means involving at least one rearwardly protruding component having an enlarged portion, each tail member to be used with said head member being of flexible, resilient construction and having a forwardmost portion in which an aperture leading to a cavity is disposed, said cavity being smaller than the enlarged portion of said rearwardly protruding component, said aperture being positioned in the tail member so as to be able to be brought into alignment with a rearwardly protruding component on said head member, and to be tightly yet removably received thereon, said rearwardly directed attachment means being mounted in a shallow recess located on said aft portion of said head member, said shallow recess being defined by a rearwardly directed lip extending around the aft portion of said head member, the outer edge of the forwardmost portion of the tail member being configured to fit in tight engagement with said rearwardly directed lip when said rearwardly protruding component has entered the cavity of the tail member.

12. The fishing lure utilizing an easily changed tail portion as recited in claim 11 in which said at least one rearwardly protruding component involves a bulbous portion adapted to be tightly received in the aperture and cavity of a tail member.

13. The fishing lure utilizing an easily changed tail portion as recited in claim 11 in which said rearwardly directed attachment means involves a pair of protruding components, each having a bulbous portion adapted to be tightly received in a respective cavity located in a tail member.

14. The fishing lure utilizing an easily changed tail portion as recited in claim 11 in which said at least one rearwardly protruding component is wide but thin and involves an enlarged portion adapted to be tightly received in a wide but comparatively thin cavity of a tail member.

15. The fishing lure utilizing an easily changed tail portion as recited in claim 11 in which said head member is made from a pair of halves taken along a vertical cutting plane, with one half being what may be regarded as the mirror image of the other half, and with the halves being secured together in a permanent manner.

16. The fishing lure utilizing an easily changed tail portion as recited in claim 15 in which a central cavity is provided in at least one of said head halves, for receiving a multiplicity of small, generally spherical members, such that a rattle chamber will be defined in a completed head member.

17. A fishing lure utilizing an easily changed tail portion, said lure having a head member of rigid construction, to which any one of a variety of generally similar tail members may be removably attached, said head member having at least two attachment points thereon, to which a fishing line as well as a fishhook may be respectively attached, said head member having a rear portion upon which rearwardly directed attachment means are mounted, said attachment means involving a pair of essentially parallel, rearwardly extending components, each component being substantially perpendicular to said rear portion of said head member, and each component having an enlarged portion, each tail member to be used with said head member being made of soft, resilient material, having a forwardmost portion in which a pair of cavities are disposed, each such cavity being smaller than the respective enlarged component portion and positioned so as to be able to be brought into alignment with said rearwardly extending components on said head member, and to be tightly yet removably received thereon.

18. The fishing lure utilizing an easily changed tail portion as recited in claim 17 in which said rearwardly extending components each involve an enlarged portion of bulbous configuration, adapted to be tightly received in a corresponding cavity of a tail member.

19. The fishing lure utilizing an easily changed tail portion as recited in claim 17 in which said rearwardly extending components each involve an enlarged portion that is essentially flat, each said rearwardly protruding component adapted to be tightly received in a corresponding cavity of a tail member.

20. A fishing lure utilizing an easily changed tail portion, said lure having a head member of rigid construction, to which any one of a variety of generally similar tail members may be removably attached, said head member having at least two attachment points thereon, to which a fishing line as well as a fishhook may be respectively attached, said head member having a rear portion upon which rearwardly directed attachment means are mounted, said attachment means involving at least one rearwardly extending component having an enlarged portion, with each attachment means being disposed in a substantially perpendicular relationship to said rear portion of said head member, each tail member to be used with said head member being made of soft, resilient material, having a forwardmost portion in which least one cavity is disposed, such cavity being smaller than said enlarged portion and positioned so as to be able to be brought into alignment with said at least one rearwardly extending component on said head member, and to be tightly yet removably received thereon, said rearwardly extending component involving an enlarged portion of bulbous configuration, adapted to be tightly received in a corresponding cavity of a tail member.

21. The fishing lure utilizing an easily changed tail portion as recited in claim 20 in which said head member is made from a pair of halves taken along a vertical cutting plane, with one of said halves being what may be regarded as essentially a mirror image of said other half, and with said halves being secured together in a permanent manner.

22. The fishing lure utilizing an easily changed tail portion as recited in claim 21 in which a central cavity is provided in at least one of said head halves, for receiving a multiplicity of small, hard, generally spherical members, such that a rattle chamber will be defined in a completed head member.

* * * * *